United States Patent
Klinghult et al.

(10) Patent No.: US 7,663,541 B2
(45) Date of Patent: Feb. 16, 2010

(54) METHOD OF TRACKING RADIO FREQUENCY SIGNALS

(75) Inventors: Gunnar Klinghult, Lund (SE); Bjorn Hansson, Malmo (SE); William O. Camp, Chapel Hill, NC (US)

(73) Assignee: Sony Ericsson Mobile Communications AB

( * ) Notice: Subject to any disclaimer, the term of this patent is extended or adjusted under 35 U.S.C. 154(b) by 185 days.

(21) Appl. No.: 10/592,244

(22) PCT Filed: Mar. 2, 2005

(86) PCT No.: PCT/EP2005/002266

§ 371 (c)(1),
(2), (4) Date: Jul. 13, 2007

(87) PCT Pub. No.: WO2005/085895

PCT Pub. Date: Sep. 15, 2005

(65) Prior Publication Data

US 2007/0273582 A1   Nov. 29, 2007

Related U.S. Application Data

(60) Provisional application No. 60/552,372, filed on Mar. 11, 2004.

(30) Foreign Application Priority Data

Mar. 9, 2004   (EP) .................................. 04388018

(51) Int. Cl.
*G01S 1/00* (2006.01)
*G01C 21/00* (2006.01)

(52) U.S. Cl. .................................. 342/357.15; 701/213
(58) Field of Classification Search ............ 342/357.15; 701/213
See application file for complete search history.

(56) References Cited

U.S. PATENT DOCUMENTS

| 5,703,597 | A | 12/1997 | Yu et al. ................. 342/357.12 |
| 5,931,890 | A | 8/1999 | Suwa et al. .................. 701/213 |
| 5,991,692 | A | 11/1999 | Spencer, II et al. .......... 701/217 |
| 6,397,146 | B1 | 5/2002 | Bruner ....................... 701/213 |
| 6,424,290 | B1 * | 7/2002 | O'Neil et al. ................. 342/55 |
| 2002/0039381 | A1 * | 4/2002 | Dooley et al. ................ 375/147 |
| 2006/0095206 | A1 * | 5/2006 | Garin et al. .................. 701/213 |

OTHER PUBLICATIONS

International Preliminary Examination Report for PCT/EP2005/002266.

* cited by examiner

*Primary Examiner*—Thomas H Tarcza
*Assistant Examiner*—Harry Liu
(74) *Attorney, Agent, or Firm*—Myers Bigel Sibley & Sajovec

(57) ABSTRACT

Embodiments of the invention are directed to a method of keeping track of and staying tuned to a transmitter even when a receiver is moving at a relatively high speed. Electronic equipment carried on fast moving vehicles and comprising receiving means can experience a shift in the frequencies received due to Doppler shift. Embodiments provide a way of taking such a Doppler shift into account by means of acceleration measurements of the electronic equipment. Some embodiments may be used in electronic equipment containing a GPS receiver or the like, where re-tracking of satellites can be power and time consuming.

17 Claims, 2 Drawing Sheets

METHOD OF TRACKING RADIO FREQUENCY SIGNALS

RELATED APPLICATIONS

The present application is a 35 U.S.C. §371 national phase application of PCT International Application No. PCT/EP2005/002266, having an international filing date of Mar. 2, 2005 and claiming priority to European Patent Application No. 04388018.6, filed Mar. 9, 2004 and U.S. Provisional Application No. 60/552,372 filed Mar. 11, 2004, the disclosures of which are incorporated herein by reference in their entireties. The above PCT International Application was published in the English language and has International Publication No. WO 2005/085895.

TECHNICAL FIELD OF THE INVENTION

This invention relates to a method of tracking a radio frequency signal by means of an electronic equipment comprising a receiver means, wherein said radio frequency signal is transmitted from a transmitter means in a frequency band with one or more frequencies and wherein the tracking of said radio frequency signals is initialized by tuning in said receiver means to said frequency band. The invention further relates to an electronic equipment comprising receiver means operable to receiver radio frequency signals by tuning said receiver means to a frequency band, an acceleration measuring device and a processor. Moreover, the invention relates to a computer program product comprising computer program code means to make a processor execute the method according to the invention.

DESCRIPTION OF RELATED ART

It is well known that the frequency and wavelength of an electromagnetic field are affected by relative motion. This is known as the Doppler effect. If a transmitter and a receiver of electromagnetic signals are moving in relation to each other, the Doppler effect can cause variations in the frequencies and wavelengths of received signals. Therefore, a receiver tuned to a transmitter can get out of tune due to a frequency shift caused the Doppler effect. This is typically only a problem, when the relative motion of the transmitter and the receiver is quite fast. A transmitter can be stationary, e.g. placed on the ground, or moving, e.g. placed on a satellite in orbit. However, the speed of a satellite typically changes relatively slowly, so that a shift of the frequency of a signal transmitted from a satellite due to the Doppler effect is substantially constant. In contrast, in e.g. aeroplanes, cars or high velocity trains, a receiver tracking signals from, i.e. being tuned to, a transmitter at a frequency or a frequency band can loose track of the transmitter due to high velocities or fast accelerations of the receiver because of the Doppler effect. This is disadvantageous to a user of the receiver, in that re-tracking of the transmitter or re-tuning of the receiver to the transmitter can be relatively time-consuming and/or power-consuming.

In U.S. Pat. No. 5,703,597 it is suggested to adjust the bandwidth of a GPS receiver's phase locked loop in response to acceleration changes of the tracked vehicle. The acceleration of the vehicle is calculated from the received GPS signals. The bandwidth of the phase locked loop is increased when a high acceleration is detected, while it is reduced for low acceleration values. Although such adjustments do improve the receiver's ability to keep track of satellites during acceleration, the increased bandwidth also introduces more noise in the receiver. It also leads to a reduced sensitivity and/or longer integration times.

U.S. Pat. No. 6,397,146 discloses another method and apparatus for compensating for acceleration in a GPS receiver. Values for one or more components of acceleration may be obtained from an accelerometer experiencing the same acceleration as the GPS receiver. A received satellite signal is translated in the GPS receiver to an intermediate-frequency band by a sequence of mixing operations, in which the satellite signal is mixed with mixing signals having frequencies that can be approximated by functions of one or more components of the acceleration and one or more parameters that are independent of acceleration.

SUMMARY OF THE INVENTION

Therefore, an object of the present invention is to provide an improved method of tracking signals transmitted from a transmitter, which method prevents the need of re-tracking or re-tuning of a receiver due to a relative motion of a receiver and a transmitter.

This object is achieved, when the method according to the opening paragraph is characterized in that it further comprises the steps of monitoring an acceleration of the electronic equipment by means of an acceleration measuring device in the electronic equipment, and modifying said frequency band to which said receiver means is tuned on the basis of said monitored acceleration. The modification of the frequency band to which the receiver means is tuned in the method according to the invention is a multiplication of a factor to the frequencies in the frequency band. Hereby, the modification of the frequency band to which the receiver means is tuned can be performed in a simple way. The factor can be determined empirically or can be calculated. Hereby, the electronic equipment comprising the receiver means can compensate for a Doppler shift of the radio frequency signal received caused by a relative motion or by changes in a relative motion between the receiver means and the transmitter means. Typically, when signal conditions are poor, a receiver can be arranged to handle this by narrowing the frequency tolerance (bandwidth) and/or by increasing the signal processing time. The former renders less data to process and the later gives a longer time to process data received. In either case, the receiver is considerably more sensitive to rapid changes in relative motion between the receiver means and the transmitter means. Using an acceleration measuring device to monitor the acceleration of the receiver means and modifying the frequency band to which the receiver means is tuned on the basis thereof is in particular valuable in compensating for this increased sensitivity during poor signal conditions. It should be noted that the term "acceleration" is means to cover also the case of nil acceleration. Similarly, the modification of the frequency band to which said receiver is tuned can be nil; for example, if the acceleration is substantially nil or below a certain threshold, the modification of the frequency band could be identity, so that the frequency band to which the receiver means is tuned is substantially unchanged.

Preferably, said factor is a Doppler shift factor. This factor can be calculated in a known way, e.g. as a function of the relative velocity between the receiver means and the transmitter means or as a function of the velocity of the receiver means. If the velocity of the electronic equipment is zero, the Doppler shift factor is equal to unity. If the receiver is approaching the transmitter, the frequency of the transmitted signal experienced at the receiver is increased compared to reception of the transmitted signal at a stationary receiver, and therefore the Doppler shift factor is greater than 1. Analogously, if the receiver is moving away from the transmitter, the Doppler shift factor is smaller than 1 (but greater than 0).

Preferably, the method further comprises the step of determining a variation in the received frequencies in said frequency band due to an acceleration of the electronic equipment monitored by said acceleration measuring device, and performing the step of modifying the frequency band to which said receiver means is tuned only if said variation exceeds a predetermined threshold. Hereby, the receiver means is only retuned when a velocity or acceleration of the electronic equipment demands retuning to avoid loosing track of the transmitter means. The threshold can be expressed as a percentage of the frequency or as an absolute frequency value.

Preferably, the method according to the invention is characterized in that the receiver means in the electronic equipment is arranged to receive signals in the UHF band. The UHF band is a part of the radio frequency band of special interest for particular purposes, such as satellite positional systems.

The method of the invention is particularly advantageous when the receiver means in the electronic equipment is arranged to receive positional signals from satellites, e.g. from satellites in a satellite positional system such as be GPS (Global Positioning System), GLONASS (Global Orbiting Navigation Satellite System), GNSS (Global Navigation Satellite Systems)/Galileo or any other current or future satellite navigation systems. Typically, such positional signals from satellite positional systems are sent from satellites in orbit around the Earth. Moreover, even though an embodiment of the invention is described herein with reference to GPS satellites, it will be appreciated that it is applicable to positioning systems which utilize pseudolites or a combination of satellites and pseudolites. Pseudolites are ground based transmitters that broadcast a signal similar to at traditional satellite-sourced GPS signal modulated on an L-band carrier signal, generally synchronized with GPS time. Pseudolites may be useful in situations where GPS signals from orbiting GPS satellites might not be available, such as tunnels, mines, buildings or enclosed areas, or as a correction to positional signals, such as in the DGPS (Differential GPS) system. The term "satellite" as used herein is intended to include pseudolites or equivalents of pseudolites and the term "GPS" as used herein is intended to include GPS-like signals from pseudolites or equivalents of pseudolites. It is understood, that positional signals received from satellites should be processed in the electronic equipment, preferably by means of a processor or the like.

It is furthermore advantageous, when the method of the invention comprises determining acceleration of the electronic equipment by means of positional signals received, and calibrating measurements of said acceleration measuring device by means of the determined acceleration. Hereby, a way of calibrating the acceleration measuring device in a simple manner is achieved.

In a preferred embodiment of the method according to the invention, the method further comprises the step of determining an acceleration of the electronic equipment by means of positional signals received by the receiver means; where said modification of said frequency band to which said receiver means is tuned is performed on the basis of said acceleration determined by positional signals received and said acceleration monitored by means of said acceleration measuring device. In cases where said monitored acceleration differs from said determined acceleration, said modification can be carried out on the basis of either said determined or said monitored acceleration. One example on such a case could be when the receiver means receives updated time data, e.g. from a mobile communication network, which updated time data could indicate a change in position of the electronic equipment, thus rendering a change in the determined acceleration. Thus, the electronic equipment can identify whether an acceleration of the electronic equipment has actually taken place and the electronic equipment can establish a modification of the frequency band to which the receiver means is tuned accordingly.

The invention moreover relates to an electronic equipment comprising receiver means operable to receiver radio frequency signals by tuning said receiver means to a frequency band, an acceleration measuring device and a processor, where the acceleration measuring device is arranged to monitor the acceleration of the electronic equipment, and the processor is arranged to modify the frequency band to which said receiver means is tuned on the basis of said monitored acceleration. The modification of the frequency band to which the receiver means is tuned is a multiplication of a factor to the frequencies in the frequency band. Hereby, the modification of the frequency band to which the receiver means is tuned can be performed in a simple way. The factor can be determined empirically or can be calculated. Hereby, the electronic equipment comprising the receiver means can compensate for a Doppler shift of the radio frequency signal received caused by a relative motion or changes in a relative motion between the receiver means and the transmitter means.

Preferably, said factor is a Doppler shift factor. This factor can be calculated in a known way, e.g. as a function of the relative velocity between the receiver means and the transmitter means or as a function of the velocity of the receiver means. If the velocity of the electronic equipment is zero, the Doppler shift factor is equal to unity. If the receiver is approaching the transmitter, the frequency of the transmitted signal experianced at the receiver is increased compared to reception of the transmitted signal at a stationary receiver, and therefore the Doppler shift factor is greater than 1. Analogously, if the receiver is moving away from the transmitter, the Doppler shift factor is smaller than 1 (but greater than 0).

Preferably, the processor of the electronic equipment is arranged to determine a variation in the received frequencies in said frequency band due to an acceleration of the electronic equipment monitored by said acceleration measuring device, and performing the modification of the frequency band to which said receiver means is tuned only if said variation exceeds a predetermined threshold. Hereby, the receiver means of the electronic equipment is only retuned, when a velocity or acceleration of the electronic equipment demands retuning to avoid loosing track of the transmitter means. The threshold can be expressed as a percentage of the frequency or as an absolute value.

It is advantageous, that the receiver means in the electronic equipment is arranged to receive signals in the UHF band, which is a part of the radio frequency band of special interest for particular purposes, such as satellite positional systems.

According to an embodiment of the electronic equipment of the invention, the receiver means in the electronic equipment is arranged to receive positional signals from satellites. Preferably, the receiver means in the electronic equipment is chosen from the list of: a GPS receiver, a GLONASS receiver, a GNSS/Galileo receiver (hereinafter the term "GPS receiver" is meant to cover any of the receivers in the above list). In handheld GPS receivers, it is well-known to use integrated acceleration measuring means to monitor any acceleration of the GPS receiver. This is used to determine the position of the GPS receiver in cases, where sufficient signals from GPS satellites cannot be achieved, for example in cities with tall buildings, in mountainous environments, etc. However, it is a problem with these GPS receivers with integrated acceleration measuring means that the tracking of GPS satellite signals can be lost by a Doppler shift of the received frequency of the GPS satellite signals due to acceleration. Thus, the above embodiment of the invention solves this problem of loosing GPS satellite signals in a GPS receiver due to acceleration. Typically, a GPS receiver is arranged to receive signal from a multitude of positional satellites at a time, at different so-called channels, possibly at different frequencies. Thus, the electronic equipment of the invention can be arranged to modify the frequency of each such channel substantially simultaneously.

In a preferred embodiment of the invention, the electronic equipment is arranged to determine an acceleration thereof by means of positional signals received, and it is arranged to calibrate said acceleration measuring device on the basis of said acceleration determined by means of said positional signals received. Hereby, a way of calibrating the acceleration measuring device in a simple manner is achieved.

In a further preferred embodiment of the invention, the electronic equipment further comprises means for determining an acceleration of the electronic equipment by means of positional signals received by the receiver means, and means for performing said modification of said frequency band on the basis of said acceleration determined by the positional signals received and said acceleration monitored by means of said acceleration measuring device. In cases where said monitored acceleration differs from said determined acceleration, said modification can be carried out on the basis of either said determined or said monitored acceleration. One example on such a case could be when the receiver means receives updated time data, e.g. from a mobile communication network, which updated time data could indicate a change in position of the electronic equipment, thus rendering a change in the determined acceleration. Thus, the electronic equipment can identify whether an acceleration of the electronic equipment has actually taken place and the electronic equipment can establish a modification of the frequency band to which the receiver means is tuned accordingly.

In yet a preferred embodiment of the invention, the electronic equipment is comprised in a mobile phone. Hereby, a mobile phone with enhanced options is achieved.

It should be noted, that the electronic equipment could be any electronic equipment, device or apparatus, which can be installed in a vehicle, such as an aeroplane, car, boat, etc. or handheld/portable, such as a handheld GPS receiver or a mobile station, such as mobile radio terminal, mobile telephone, pager, communicator (e.g. electronic organizers, smart phones, etc.), comprising a GPS receiver. The electronic equipment and the computer program product have the same advantages as the method described above for the same reasons. Moreover, it should be noted that if the receiver means is capable of being tuned to more than one frequency band, i.e. being tuned to more than one channel, at a time, it is possible, but not necessarily so, that the method could be carried out at each frequency band/channel.

Throughout this description and the claims, the term "tune" is meant to cover the operation of adjusting a receiver to a frequency or frequency band and the term "track" is meant to indicate the actual reception of a signal at the desired frequency or frequency band. An acceleration measuring device can be accelerometer, g-sensor, or any other means by which acceleration can be determined accurately. The term "frequency band" is meant to cover a band of adjacent frequencies as well as one specific frequency. The term "monitored acceleration" is meant to be synonymous to "acceleration determined by the acceleration measuring device of the electronic equipment, and the term "determined acceleration" is meant to be synonymous to the acceleration of the electronic equipment determined by means of positional signals received by the receiver means of the electronic equipment.

It should be emphasised, that the term "comprise/comprises" when used in this specification is taken to specify the presence of stated features, integers, steps or component but does not preclude the presence or addition of one or more other features, integers, steps, components or groups thereof.

BRIEF DESCRIPTION OF THE DRAWINGS

The invention will be described more fully below in connection with preferred embodiments and with reference to the drawings, in which.

DETAILED DESCRIPTION OF EMBODIMENTS

Figure 1:
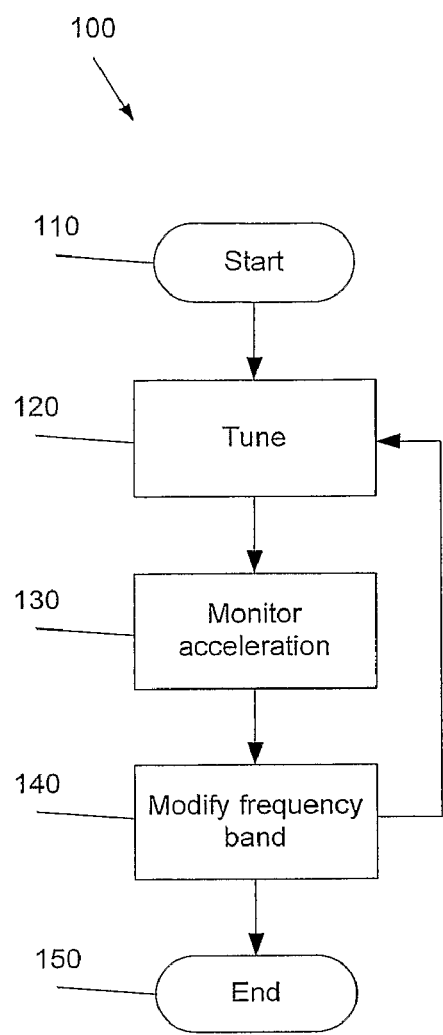
FIG. 1 shows a flow chart of a method according to an embodiment of the invention.

FIG. 1 shows a flow chart of a method 100 according to an embodiment of the invention. The method starts in step 110. In step 120 a receiver is tuned to a certain frequency or frequency range, which possibly but not necessarily could be predetermined. Thus, the method 100 can be applied to track signals at predetermined frequency and/or to search for signals in a frequency band and to lock to a frequency at which desired signals are transmitted. Said frequency can be any frequency in the radio frequency band, i.e. from between about $10^5$ to about $10^{11}$ Hz. Examples of frequencies can be FM radio signals at frequencies between 88 and 108 MHz, AM radio signals at frequencies between 535 and 1700 kHz, or GPS signals transmitted at frequencies of about 1227 MHz and about 1575 MHz. Typically, this step 120 of the method 100 is initially only performed once or a few times, until a signal at a desired frequency is tracked; hereafter, step 120 is only performed whenever the frequency or the frequency band to which the receiver is tuned is modified.

The method 100 continues in step 130, where an acceleration measuring device, which is connected to or in communication with the receiver, monitors any acceleration of the receiver. This monitoring of the acceleration of the receiver renders a calculation of an experienced Doppler shift possible. In theory, such a Doppler shift of the received frequency will occur, whenever the receiver is moving; however, only at velocities of the receiver above a velocity, the Doppler shift will influence the experienced received frequency. Nevertheless, such velocities can be experienced on board of aeroplanes, high velocity trains and in fast driving cars. Preferably, step 130 is performed continuously or at quite short time intervals, so that any acceleration of the receiver is perceived and taken into consideration.

In step 140 of the method 100, the frequency band to which the receiver is tuned is modified corresponding to the experienced Doppler shift of the received frequency or frequency band. This modification preferably is a factor multiplied to the frequency/frequencies to which the receiver is tuned, so that the receiver becomes tuned to a modified frequency to track the desired signal transmitted at the certain frequency. If the receiver is approaching the transmitter, the frequency of the transmitted signal experienced at the receiver is increased compared to reception of the transmitted signal at a stationary receiver, and therefore said factor is greater than 1. Correspondingly, said factor is smaller than 1, if the receiver is moving away from the transmitter. The factor is a Doppler shift factor calculated in accordance with known theory, e.g. the theory of relativity.

Subsequent to he modification of the frequency band in step 140 step 120 of the method 100 is repeated to keep track of the desired signal, and thereafter the steps 130 and 140 is performed again, preferably as long as the receiver is turned ON or as long as a motion of the receiver is possible. Thus, the method 100 can be a functionality or application program of an electronic equipment comprising the receiver, which functionality can be turned on or off corresponding to user needs. However, whenever it is to be expected that the receiver moves, a use of the method 100 will be power and time saving, because the receiver continues tracking signals transmitted at a certain frequency even when a Doppler shift influences the frequency at which the signal can be tracked, so that time and power consuming re-tracking of the transmitter can be avoided. The method 100 ends in step 150, typically whenever the receiver or the functionality in the receiver carrying out the method is turned off.

Figure 2:
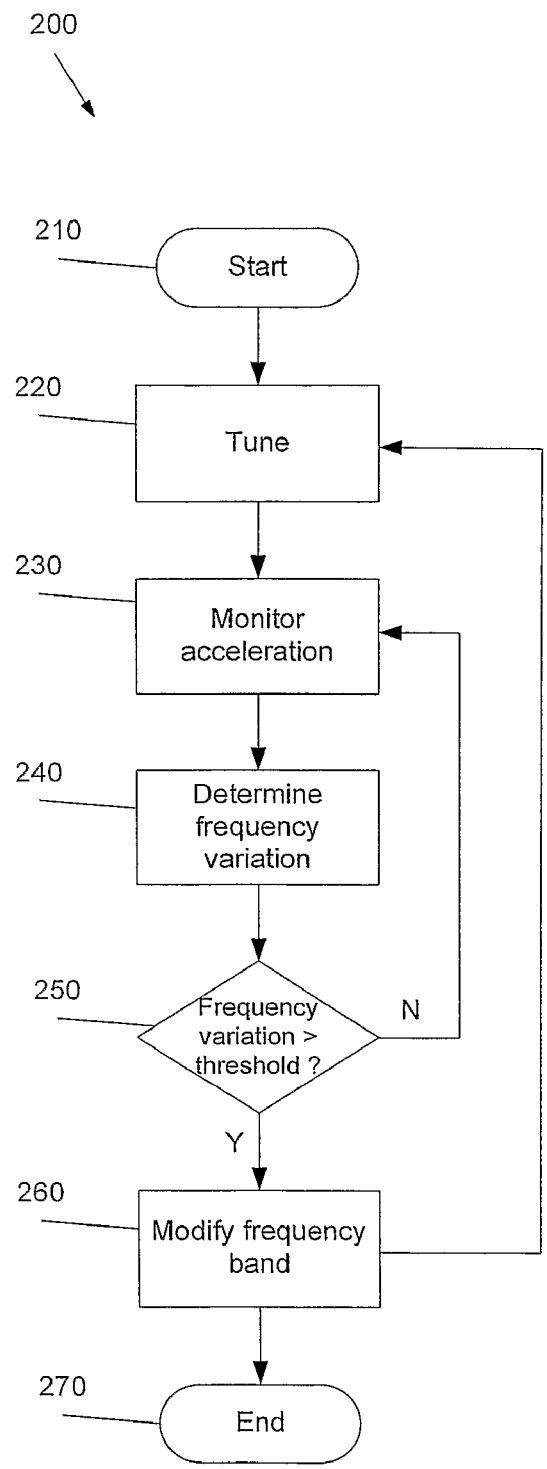
FIG. 2 shows a flow chart of an alternative method according to another embodiment of the invention.

FIG. 2 shows a flow chart of an alternative method 200 according to another embodiment of the invention. Some of the steps of the method 200 are equivalent to some of the steps of the method 100 described above. These steps will be described shortly only.

The method 200 starts in step 210. In step 220, a receiver is tuned to a certain frequency or frequency range, which possibly but not necessarily could be predetermined. Thus, the method 200 can be applied to track signals at predetermined frequency and/or to search for signals in a frequency band and to lock to a frequency at which desired signals are transmitted. Said frequency can be any frequency in the radio frequency band. Typically, this step 220 of the method 200 is initially only performed once or a few times, until a signal at a desired frequency is tracked; hereafter, step 220 is only performed whenever the frequency or frequency band to which the receiver is tuned is modified.

The method 200 continues in step 230, where an acceleration measuring device, which is connected to or in communication with the receiver, monitors any acceleration of the receiver as described above in relation to FIG. 1. Preferably, step 130 is performed continuously or at quite short time intervals, so that any acceleration of the receiver is perceived and taken into consideration.

In step 240 of the method 200, any variation in the frequency of the signal transmitted from the transmitter, to which the receiver is tuned, due to an acceleration or a velocity of the receiver is determined. In step 250 the frequency variation determined in step 240 is compared to a threshold. If the frequency variation equates or exceeds said threshold, the flow of the method 200 continues to step 260; otherwise, the flow goes back to step 230. In step 260, the frequency band to which the receiver is tuned is modified corresponding to the experienced Doppler shift of the received frequency or frequency band in the same way as described in relation to step 140 of the method 100.

Subsequent to the modification of the frequency band in step 260, step 220 of the method 200 is repeated to keep track of the desired signal, and thereafter the flow continues to the subsequent steps, preferably as long as the receiver is turned ON or as long as a motion of the receiver is possible. Thus, the method 200 can be a functionality or application program of an electronic equipment comprising the receiver, which functionality can be turned on or off corresponding to user needs. However, whenever it is to be expected that the receiver moves, a use of the method 200 will be power and time saving, because the receiver continues tracking signals transmitted at a certain frequency even when a Doppler shift influences the frequency at which the signal can be tracked, so that time and power consuming re-tracking of the transmitter can be avoided. The method 100 ends in step 270, typically whenever the receiver or the functionality in the receiver carrying out the method is turned off.

Figure 3:
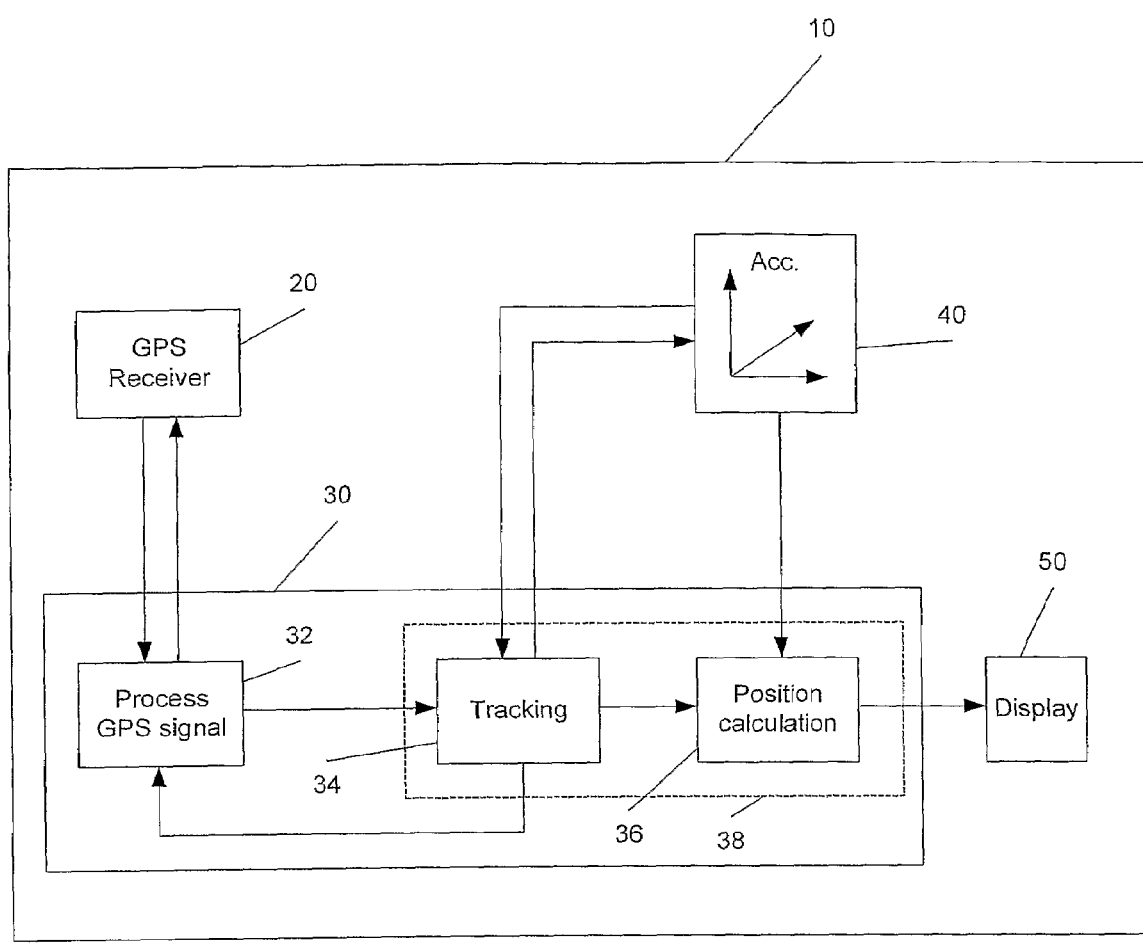
FIG. 3 shows a diagram of an exemplary electronic equipment arranged to perform the method of the invention.

FIG. 3 shows a diagram of an exemplary electronic equipment 10 arranged to perform the method of the invention. The electronic equipment 10 comprises a GPS receiver 20, a processor 30, an accelerometer 40 and a display 50. Even though a GPS receiver is used in this description, any receiver of positional signals from navigational satellite systems could be used, such as GLONASS, GNSS/Galileo or any other current or future satellite navigation systems. The electronic equipment 10 can be any electronic equipment, device or apparatus, which can be installed in a vehicle, such as an aeroplane, car, boat, etc., or handheld/portable, such as a handheld GPS receiver or a mobile station, such as mobile radio terminal, mobile telephone, pager, communicator (e.g. electronic organizers, smart phones, etc.), comprising a GPS receiver. FIG. 3 only shows those elements of the electronic equipment 10 which are necessary to describe the invention.

The GPS receiver 20 is arranged to carry out the reception of GPS signals from satellites in the GPS. Civilian GPS signals from satellites are typically transmitted at a frequency of 1575.42 MHz, so the receiver is tuned to this frequency for reception of the GPS signals. However, the GPS receiver could be tuned to any other frequency at which GPS signals are transmitted.

A typical GPS signal comprises three different types of information: a pseudorandom code, ephemeris data and almanac data. The pseudorandom code is an identification code identifying the satellite transmitting the signal. The ephemeris data, which is constantly transmitted by each satellite in the GPS, contains information about the status of the satellite and the current date and time. This part of the signal is essential for determining a position of the receiver. Finally, the almanac data contains information of where each GPS satellite should be at any time throughout the day. Each satellite transmits almanac data showing orbital information for that satellite and for every other satellite in the system.

Block 30 of the electronic equipment 10 is a processor. Some of the functions of the processor 30 are shown in the blocks 32, 34, 36 and 38. In block 32, the received GPS signal is processed, so that the different types of data described above are extracted.

As the almanac data in the GPS signals contains information regarding the orbits of the satellites in the GPS, the processor 30 uses, in block 34, the processed GPS signals to lock onto the satellites from which it receives GPS transmissions. Thus the tracking performed in block 34 is used in block 32 which again influences the actual reception of the GPS signals in the GPS receiver 20. The processed GPS signals and the tracking thereof are used in block 36 for position calculation of the electronic equipment 10. When signals from three or more satellites are received by the GPS receiver, the position of the GPS receiver can be determined with a high accuracy, typically within 5-15 meters. Once the position of the electronic equipment 10 has been determined, the processor 30 can calculate other information, such as velocity, acceleration, bearing, trip distance, etc. The position calculated in block 36 can be displayed on the display 50 of the electronic equipment 10, either as latitude and longitude, an address or at a map.

The electronic equipment 10 moreover comprises an accelerometer 40, preferably a three axis accelerometer. It is well known to use an accelerometer 40 to assist the position calculation performed in block 36 in cases where reception of GPS signals is obscured, for instance in dense foliage or urban settings with tall buildings. This is described in detail below in connection with a Kalman filter 38. Thus, when the GPS receiver 20 cannot receive sufficient signals for performing an accurate position calculation, the information from the accelerometer 40 can be used to calculate alterations in the position of the electronic equipment 10. According to the invention, the measurements of the accelerometer 40 can also be used in the tracking performed in block 34, so that the traditional tracking method can be supplemented by the method 100 or 200 described above to take any shift in the frequency/frequencies at which the GPS signals can be received is taken into account. Finally, the accelerometer 40 can be calibrated by means of determination of the position, velocity and/or acceleration of the electronic equipment 10 based on the received GPS signals, which is indicated by the arrow from the block 34 to the accelerometer 40 in FIG. 3.

The block 38 indicates an approach to perform the tracking and position calculation described above, viz. by means of a Kalman filter. A Kalman filter is a set of mathematical equations, viz. an optimal recursive data processing algorithm. The Kalman filter supports estimations of past, present and future states of a system. The Kalman filter 38 has internal variables that correspond to position in three dimensions, velocity in three dimensions and acceleration in three dimensions.

In the traditional solution of position measurement on the basis of GPS signals, where only position in three dimensions are input to the Kalman filter, the Kalman filter develops solutions for the velocity and acceleration. Subsequently, the Kalman filter integrates on the velocity and acceleration values to smooth the solution versus time.

In the Kalman filter 38 of the electronic equipment 10 in FIG. 3, the information regarding one of the values above, i.e. the acceleration values, can be supplemented with additional information from the accelerometer 40. In this manner the additional information from the accelerometer 40 can continue the Kalman filter process even in the absence of inputs from the GPS system. The acceleration variables can be modified as:

$$A_x = A_{x,old} \cdot (1-\lambda) + \lambda \cdot a_x$$

$$A_y = A_{y,old} \cdot (1-\lambda) + \lambda \cdot a_y$$

$$A_z = A_{z,old} \cdot (1-\lambda) + \lambda \cdot a_z$$

where $A_x$, $A_y$, $A_z$, respectively, denotes the acceleration in the directions of the x, y, and z axis of an Euclid coordinate system; $A_{x,old}$, $A_{y,old}$, $A_{z,old}$, respectively, denotes the old values of the accelerations in the directions of the x, y and z axis; $a_x$, $a_y$, $a_z$, respectively, the accelerations in the directions of the x, y and z axis measured by means of the accelerometer, and $\lambda$ is a factor between 0 and 1.

As described above, one of the benefits of the invention is that the data from accelerometers can be used as input to the tracking method to improve the reliability and bandwidth (frequency shift tolerance) of the tracking method. The increased tracking bandwidth can eventually be traded for increased signal sensitivity, if desired.

Still referring to FIG. 3, an example where the electronic equipment comprising receiver means arranged to receive positional signals from satellites, e.g. a GPS receiver 20, comprised in a mobile telephone, is described. The electronic equipment also comprises a clock (not shown) determining reference time of the electronic equipment, which reference time is used i.a. in the processing of GPS signals in block 32. When the electronic equipment 10 is comprised in a mobile telephone adjustments to timing information and/or frequency information of the electronic equipment can be sent to the electronic equipment over a mobile communications network, e.g. as an update of reference time and/or reference frequency.

Such an adjustment can give rise to an update of the position of electronic equipment 10 in that the position of the electronic equipment determined by means of GPS signals depends on the time of reception of the signals, and thus a change in the velocity and acceleration thereof can be indicated. However, since the electronic equipment 10 comprises an accelerometer 40, such adjustments of the velocity/acceleration can be compared to the monitored acceleration of the electronic equipment performed by the accelerometer. Thus the electronic equipment is capable of distinguishing the two cases, i.e. the case where an update of the timing information received via a mobile communication network gives rise to a calculated change in position and/or velocity and/or acceleration of the electronic equipment 10, and the case where the accelerometer monitors an acceleration of the electronic equipment. This is advantageous since the tracking of satellites is influenced differently in the two cases as explained in the following, but hitherto the two cases have not been distinguishable from each other.

In the former case, an update of the reference time or reference frequency of the electronic equipment might cause the GPS receiver 20 to loose track of all the satellites. If, however, the accelerometer 40 indicates that no special or sudden alterations or changes of the movement of the electronic equipment 10 have occurred, it can be determined that the electronic equipment 10 has been subject to a change in reference frequency or reference time due to an update. In this case it a strong presumption that the signals from all the satellites have changed by an unknown, but equal amount. Thus, the re-tracking of the satellites can be optimized by tuning the channels, at which signals from satellites are received, by the most likely frequency shifts. For instance the frequency of a first channel can be shifted up by 30 Hz, a second channel can be shifted down by 30 Hz, a third channel can be shifted up by 60 Hz, etc. Hereby, it is likely for the receiver quickly to track a satellite on at least one channel and this frequency shift is identified. Since this identified frequency shift should be the same for all channels (in this case where the receiver has not accelerated substantially), the remaining satellites can be re-tracked by the GPS receiver 20 by adjusting the frequencies, to which the channels of the GPS receiver 20 is tuned, by the identified frequency shift. Thus, the time and power spent for re-tracking of satellites can be substantially reduced. In the latter of the two cases, the modification of the frequency band as described earlier can be used, in that the frequency shift thus is caused by the Doppler effect.

The example above could be enhanced further by keeping track of accelerations during the re-tracking described, i.e. in the interval from the time where the receiver means lost track of the satellites until the first channel has been re-tracked and compensate the re-tracking of the remaining channels for the acceleration, which has taken place, and thus for the corresponding change in received frequency due to Doppler effect. Moreover, the re-tracking of the channels of the receiver means 20 can include taking the Doppler effect due to the movement of the satellites into account by using the information in the Ephemeris data.

It shall be noted, that the above example is only an example, and that any other suitable multi-channel tracking devices than a GPS receiver could be used as well as any mobile station comprising communication means could be used.

The invention claimed is:

1. A method of tracking a radio frequency signal by means of an electronic equipment comprising a receiver and an acceleration measuring device, wherein the radio frequency signal is transmitted from a transmitter in a frequency band with one or more frequencies, the method comprising:
   initializing the tracking of the radio frequency signal that is transmitted from the transmitter comprises tuning the receiver to the transmitted frequency band;
   monitoring an acceleration of the electronic equipment with the acceleration measuring device in the electronic equipment; and
   modifying the frequency band to which the receiver is tuned on the basis of the monitored acceleration,
   wherein the step of modifying the frequency band to which the receiver is tuned comprises multiplying the frequencies of the frequency band by a factor calculated from the monitored acceleration.

2. A method according to claim 1, wherein calculated factor comprises a Doppler shift factor.

3. A method according to claim 1 further comprising:
   determining a variation in the received frequencies in the frequency band due to an acceleration of the electronic equipment monitored by the acceleration measuring device; and
   modifying the frequency band to which the receiver is tuned only if the variation exceeds a predetermined threshold.

4. A method according to claim 1, wherein the receiver in the electronic equipment is configured to receive signals in the UHF band.

5. A method according to claim 1, wherein the receiver in the electronic equipment is configured to receive positional signals from satellites.

6. A method according to claim 5, further comprising:
   determining an acceleration of the electronic equipment in response to positional signals received by the receiver; and
   calibrating measurements of the acceleration measuring device in response to the determined acceleration.

7. A method according to claim 5, further comprising determining an acceleration of the electronic equipment by the acceleration measuring device in response to positional signals received by the receiver;
   wherein the modification of the frequency band to which the receiver is tuned in response to the determined acceleration.

8. A computer program product comprising computer program code configured to be carried out by a processor to execute the method according to claim 1.

9. An electronic apparatus operable to receive radio frequency signals transmitted in a frequency band, the apparatus comprising:
   a receiver configured to be tuned to the transmitted frequency band;
   an acceleration measuring device configured to monitor an acceleration of the electronic apparatus; and
   a processor configured to modify the frequency band to which the receiver is tuned on the basis of the monitored acceleration,
   wherein the processor is configured to modify the frequency band to which the receiver is tuned by multiplying the frequencies in the frequency band by a factor calculated from the monitored acceleration.

10. An electronic apparatus according to claim 9, wherein calculated factor comprises a Doppler shift factor.

11. An electronic apparatus according to claim 9, wherein the processor is configured to determine a variation in the received frequencies in the frequency band due to an acceleration of the electronic equipment monitored by the acceleration measuring device, and to perform the modification of the frequency band to which the receiver means is tuned only if the variation exceeds a predetermined threshold.

12. An electronic apparatus according to claim 9, wherein the receiver in the electronic apparatus is configured to receive signals in the UHF band.

13. An electronic apparatus according to claim 9, wherein the receiver in the electronic equipment is configured to receive positional signals from satellites.

14. An electronic apparatus according to claim 13, wherein the receiver is selected from the group consisting of: a GPS receiver, a GLONASS receiver, or a GNSS/Galileo receiver.

15. An electronic apparatus according to claim 13, further comprising:
   an acceleration measuring device configured for determining an acceleration of the electronic apparatus in response to positional signals received by the receiver; and
   means for performing the modification of the frequency band on the basis of the acceleration determined by the positional signals received and the acceleration monitored by the acceleration measuring device.

16. An electronic apparatus according to claim 13, wherein the electronic apparatus is configured to determine an acceleration thereof in response to positional signals received, and to calibrate the acceleration measuring device in response to the determined acceleration.

17. An electronic apparatus according to claim 9, wherein the electronic apparatus comprises a mobile phone.

* * * * *